Jan. 30, 1951 L. G. FISCHER 2,539,413
DIRECTION FINDING SYSTEM
Filed April 6, 1946 2 Sheets-Sheet 2
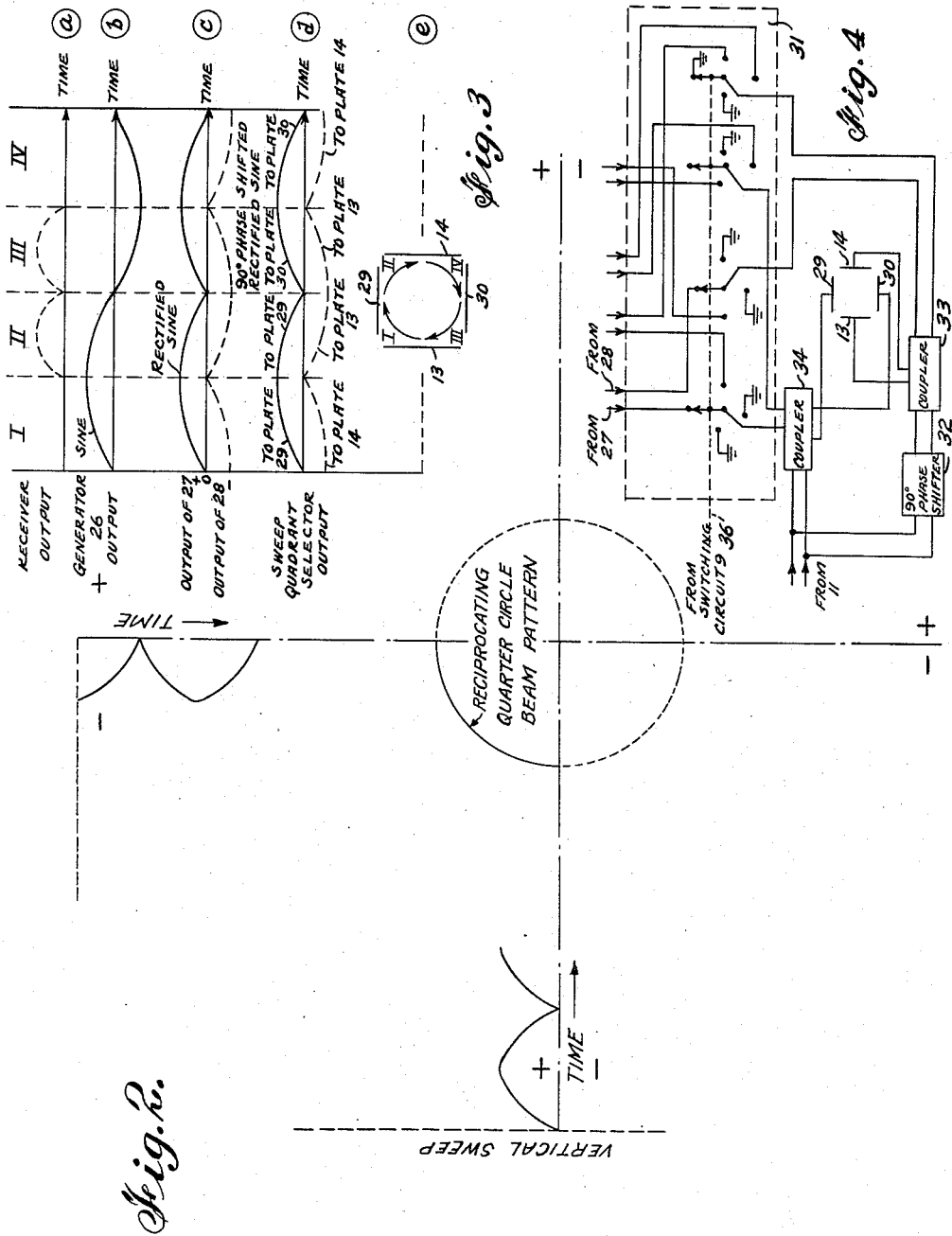
INVENTOR.
LAURIN G. FISCHER
BY
R P Morris
ATTORNEY Patented Jan. 30, 1951

2,539,413

UNITED STATES PATENT OFFICE 2,539,413

DIRECTION FINDING SYSTEM

Laurin G. Fischer, New York, N. Y., assignor to Federal Telephone and Radio Corporation, New York, N. Y., a corporation of Delaware Application April 6, 1946, Serial No. 660,101

11 Claims. (Cl. 343—120)

This invention relates to direction finders and more particularly to methods and apparatus for synchronizing the switching in the direction finder indicator where the complete rotation of a single directive pattern is not feasible.

In the copending application, Serial Number 553,598, filed September 11, 1944, by H. G. Busignies, a direction finding system has been disclosed which utilizes a plurality of separate directive antennas which are arranged to sweep contiguous submultiple angles of a 360° arc. The system disclosed proposes to synchronize the directive sweep of four antenna arrays with each successive quarter circle sweep of an indicating oscilloscope associated with the system. This requires rather careful synchronization of all of the antennas with respect to each other, that is a synchronization and equalization of the speed of the line phasers and their motors used to produce successive directive sweeps of the respective antennas.

It is an object of this invention to provide for a direction finding system employing multiple antennas producing constant angular sweeps, a method and apparatus for synchronizing the individual antenna sweeps with the sweep of the indicating oscilloscope.

It is a further object to provide synchronization for apparatus of the above-defined type which makes the synchronization of one antenna unit with respect to the next one unnecessary.

Another object is to provide a synchronization which permits the operation of the phaser motors at one-fourth the original speed without an increase in the resulting flicker.

A still further object is to provide a synchronization for direction finding apparatus as between the antenna and oscilloscope sweep which is simple and minimizes difficulties of operation.

In accordance with the present invention, I provide in a direction finding system, which otherwise is similar to the one disclosed in the above-named copending application, for two full-wave rectified sine waves in quadrature phase to be applied to the deflection plates of the cathode ray oscilloscope for each of the antennas used whereby a quarter circle reciprocating beam is obtained corresponding to the angle of sweep covered by the respective antennas. By causing the rotary line phaser associated with each of the antennas to produce the corresponding reciprocating 90° sweep, a perfect synchronization between the sweep of the antenna and of the indicating oscilloscope beam will be obtained for each independent antenna array. This may be accomplished by providing a sine wave generator, to be driven by the phaser motor and disposed on the same shaft as the line phaser, which feeds into a dual full-wave rectifier, having an output of significant polarities, the cusps of which are applied to the plates of the cathode ray tube after subjection to suitable selection control in a sweep quadrant selector.

While my invention is defined in the accompanying claims, a better understanding of it, however, and of the objects and features thereof may be had from the particular description of an embodiment thereof with reference to the accompanying drawings in which:

Fig. 2 is a graphical illustration of representative sweep voltages applied to the indicating oscilloscope in the circuit of Fig. 1.

Fig. 3 illustrates graphically the signal waveforms available in the various circuits of applicant's arrangement resulting from the switching corresponding to the sector scanning of the antenna system.

Fig. 4 illustrates schematically a simple switching circuit for carrying out the operations corresponding to wave shapes of Fig. 3.

Figure 1:
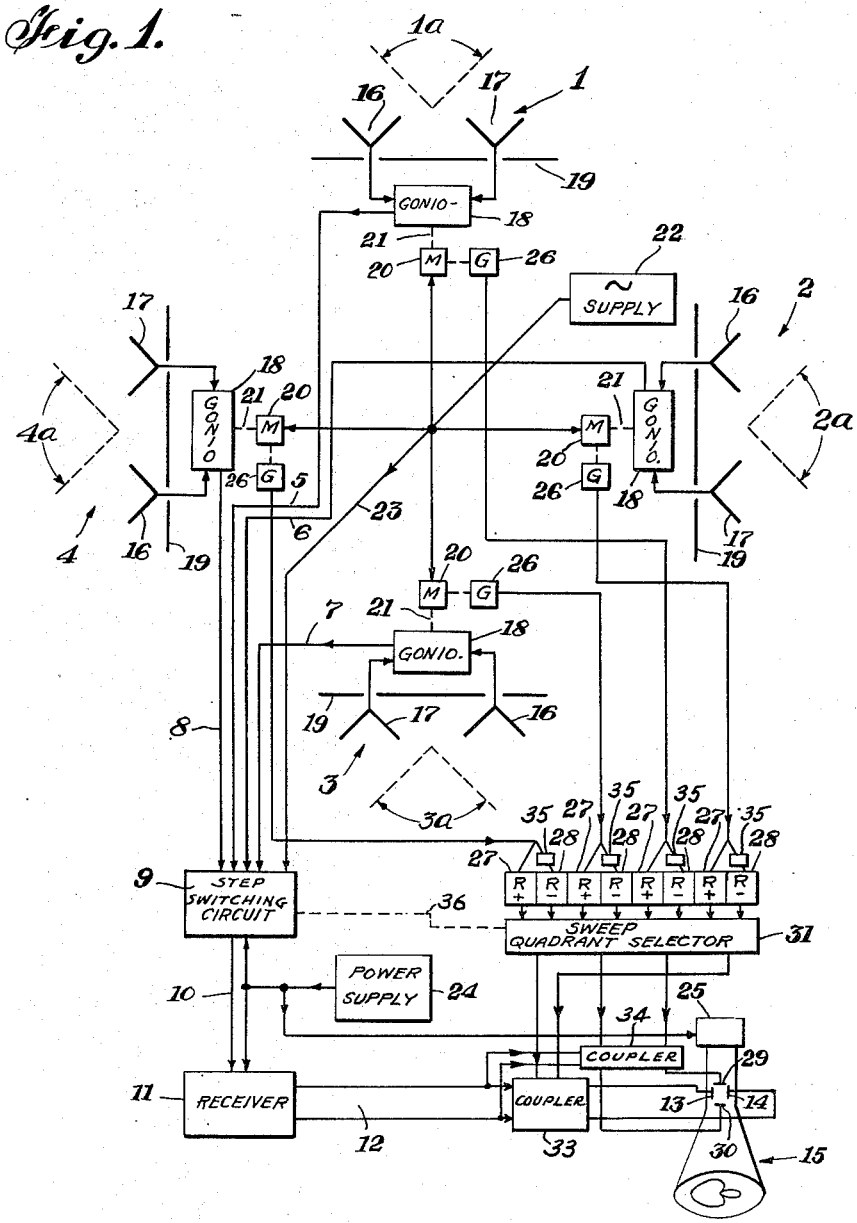
Fig. 1 is a block circuit diagram of a direction finder incorporating the features of my invention.

Turning to Fig. 1, four directive antennas 1, 2, 3 and 4, are illustrated, these antennas being controlled to sweep their directive action through substantially 90° angles as indicated at 1a, 2a, 3a and 4a and as explained below. The antennas are coupled over lines 5, 6, 7 and 8, respectively, to a switching circuit 9 which serves successively to apply received energy over line 10 to a receiver 11. The output of receiver 11 is applied over lines 12 to horizontal deflection plates 13 and 14 after passage through coupler 33, and through coupler 34 to plates 29 and 30 of a cathode ray oscilloscope 15.

Antennas 1, 2, 3 and 4 may each comprise two antenna elements 16 and 17 coupled to a goniometer element 18. These goniometers may be of the phase shift type serving, through a reciprocating contact device, to shift the directive patterns of the antenna pairs 16, 17 through an arc of substantially 90° by variation of the relative phases fed to these pairs. Shields 19 are provided for each of the antennas to prevent interaction of the antennas and to render the antennas unidirectional. The goniometers or directive control units 18 are controlled by driving means, preferably synchronous motors 20 over driving connections 21. A common alternating current supply 22 serves to supply energy to each of the motors 20 and simultaneously to switching circuit 9 over a line 23. Thus, the switching circuit acts successively to couple antennas 1, 2, 3 and 4 to receiver 11 during a period corresponding to the angular sweeps of the separate directive antennas. A power supply source 24 furnishes power to the switching circuit 9, receiver 11 and to the control circuit 25 of the oscilloscope indicator 15.

Each of the motors 20 has associated therewith a sine wave generator 26 to be driven thereby. The generators 26 are each provided with two rectifiers 27 and 28 to produce a positive and negative full wave rectified sine wave, two of which are applied in phase quadrature to the proper vertical and horizontal deflection plates 13, 14, 29 and 30 of the oscilloscope 15 after having been subjected to a selection as to quadrants in a sweept quadrant selector 31. The selector 31 is controlled in its operation from the switching circuit 9. This selector may be of any known electrical type, which shall operate to feed successively to the pairs of deflecting electrodes of the oscilloscope the proper combination of positive and negative voltages derived from the rectification, as described below for the successive quadrants, each time the control for such quadrant is impressed on the selector from switching device 9. It is, of course, possible to select quadrants either mechanically or electrically.

In Fig. 2, there has been illustrated the type and relationship of two sweep controlling rectified sine waves which, in the instance illustrated, are used to produce a quarter circle beam pattern in the fourth, or upper left quadrant by the use of a positive vertical and a negative horizontal rectified sine wave, which are in quadrature phase. Successive quadrants on the oscilloscope may be chosen by applying plus-plus, minus-plus, minus-minus, and plus-minus voltages to the deflecting plates. These voltages, varying in value according to the instantaneous values of the sine wave, from which they are derived, in combination provide a resultant for causing beam movement. The respective quadrants and the associated voltage polarities are indicated in Fig. 2 and correspond to the respective polarities of the rectified waves indicated in the various rectifiers 27 and 28 in Fig. 1.

Thus for a particular cycle of operation, the supply 22 successively switches the outputs of each goniometer to the receiver 11 by means of switching circuit 9. This circuit may comprise for example, a continuous stepping relay or motor. This switching function is shown schematically in Fig. 3, wherein the numerals I, II, III, IV correspond to the four periods of a switching cycle and also the successive coupling of the goniometer corresponding to sectors 1a, 2a, 3a and 4a. The output of the receiver for an exemplary case where a signal is being received from a direction between quadrants 2a and 3a is shown at a of Fig. 3. This null type of radiation pattern is more completely disclosed in the copending application #553,598 previously mentioned. The output of each generator 26 comprises a sine wave as shown at b. Each of the sine waves are full wave rectified in 27, and phase advanced 90° in 35 and full wave rectified in 28 to provide respective full wave rectified sine and cosine outputs as shown in c. Each of these rectified outputs is applied to selector 31 to be sequentially applied to the horizontal or vertical deflection elements in synchronism with the operation of circuit 9 and hence under control of supply 22. Assuming for simplicity that all the motors are synchronized, then all of the generator sine waves will be in phase, and hence all the rectified sine waves will be in phase and similarly the rectified cosine waves. The selector 31 which may comprise the arrangement shown in Fig. 4, switches rectified sine and cosine waves under control of circuit 9 by means of coupling 36 and hence under control of 22 to the deflection elements of the indicator 15. Thus during the first period I, the rectified generator sine output corresponding to sector 4a is applied to plate 29 through coupler 34 and the rectified cosine output through coupler 33 to plate 14, plates 13 and 30 being grounded through couplers 33 and 34 respectively as shown in Fig. 4. This method of coupling is disclosed in greater detail in the copending application #553,562 below mentioned. During period II, the rectified sine output corresponding to sector 1a is applied to 29 and the rectified cosine output to 13, plates 14 and 30 being grounded. Similarly for period III and IV the rectified outputs are applied to the deflection plates as indicated at d. The circular trace produced on the screen of the indicator as shown at e is broken up into the sectors as shown by I—IV.

Although the operation of the direction finding system and the individual antenna array and associated oscilloscope sweeps is apparent from inspection of the drawings, it is well to point out that, as the goniometers, the operation of which has been explained in detail in the above-identified application by Busignies, are operated by the motors 20 they cause a 90° directive sweep of the associated antenna arrays, as also disclosed by Nathan Marchand in his copending application, Serial No. 553,562, filed September 11, 1944. The goniometers may be continuously operated for all four of the antennas and are preferably arranged so that the sweep of the next successive antenna will begin substantially at the same point where the corresponding sweep of the next preceding antenna has been discontinued. Because of the switching circuit 9, each antenna will be effective to pass energy to receiver 11 only during the time when it is sweeping through one 90° arc. Other angles may, of course, be swept if the number of antennas is more or less than the four illustrated. The switching circuit, which may, as already pointed out, be electrically or mechanically operated, not only controls the passage of energy to the receiver in accordance with the successive antenna sweeps, but also controls the quadrant selector 31 so that the rectified sine waves having the proper polarities and corresponding to the generator associated with the antenna from which energy is being received are being applied to the deflectors of the oscilloscope. Thus, perfect synchronization between the antenna and the indicator sweeps can be obtained for each independent antenna array. Further, since each array supplies its own sweep, no alignment is necessary between individual units and the speed of the sweeps need not be identical. The sweeps may be made frequent enough to give the impression of a continuous full circle sweep.

While the above is a description of the principles of this invention in connection with specific apparatus, it is to be clearly understood that this description is made only by way of example and not as a limitation on the scope of this invention as set forth in the objects.

I claim:

1. A direction finder for indicating the direction of transmitting stations within a given arc, comprising means for producing a plurality of directive radiant energy receiving patterns, means for sweeping the directive effect of said patterns successively thru given contiguous angles to define together said given arc, means for producing in synchronism with the respective sweeps of each pattern thru its angles a corresponding indicator trace, each corresponding to respective angular portions of said arc, and means for applying received energy from said directive patterns to combine with said traces and to produce deflections of said traces to indicate the directive position of transmitting stations within said arc.

2. A direction finder system comprising means for producing a plurality of directive radiant energy receiving patterns, means for sweeping the directive effect of said patterns successively thru given contiguous angles to define together said given arc, an indicator, means for producing in synchronism with the sweep each of said patterns respectively an indicator trace each corresponding to the respective angular portions of said arc, a receiver, means for successively coupling said pattern producing means to said receiver, and means for applying the output of said receiver to said indicator to produce a deflection of said trace in response to received signals.

3. A direction finder system for indicating the direction of transmitting stations within a given arc, comprising a plurality of directional antennas each having a given directional characteristic, means for controlling said directional antennas to successively sweep said directional characteristic through contiguous portions of said given arc, an indicator, means for providing a series of independent traces on said indicator corresponding to said respective arc portions, means for synchronizing traces with the respective sweeps of said antennas over the corresponding given arc positions, a receiver means for successively coupling said antennas to said receiver during the periods of said successive sweeps, means for bringing into correspondence said indicator sweep means with the respective sweeps of said antennas, and means for applying the output of said receiver to said indicator to produce a deflection of said indicator sweeps in response to received signals.

4. A direction finder system comprising a plurality of unidirectional antennas each having a single directional characteristic, means for controlling said antennas to successively sweep the directional characteristics of successive antennas through predetermined angles to provide a resultant sweep through an angle substantially equal to the sum of said predetermined angles, a receiver circuit having an input and an output, means for cyclically coupling said antennas in succession to said receiver in timed relation with respect to said successive sweeps, an indicator, circuit means for providing an indicating trace on said indicator one corresponding to each of said antennas, means for establishing correspondence between the occurrence of said traces and the sweeping of corresponding predetermined angles by the respective antennas, and means for applying the output energy from said receiver to said indicator to produce deflections of said trace lines in response to said output energy.

5. A direction finder system comprising a plurality of directive antennas each arranged to produce radiation patterns having a single directive characteristic, control means for sweeping said characteristics through predetermined angles such that they define together a substantially 360° arc, receiver means, switching means for cyclically coupling successive ones of said antennas to said receiver means for a period corresponding to the time the corresponding antenna is being swept through said predetermined angle, an oscilloscope indicator, means for sweeping the beam of said oscilloscope over predetermined sweep paths in correspondence with the sweeping by said antennas of respective predetermined angles in respect to time and position on said indicator, and means for coupling said receiver means to said oscilloscope to provide deflections of said sweep beam in response to received signals.

6. A direction finder system comprising a plurality of directive antennas arranged about a given point each having its directive action outwardly from said point, control means for controlling the directive action of each of said antennas to sweep it through a given angle whereby said antennas cover a resultant 360° angle sweep about said point, synchronous drive means for driving said control means, an indicating oscilloscope having an indicating beam, means for moving said beam to produce trace lines in synchronism with and corresponding in number and timing to the sweep of each of said antennas through a respective given angle, a receiver circuit having its output circuit coupled to said indicator to produce deflections of said beam effective on said traces in response to received signals, and a switching circuit for successively coupling said antennas to said receiver and said beam moving means for a period substantially equal to the time the corresponding directive action is being swept through its given angle.

7. A direction finder according to claim 6, in which said beam moving means includes a source of sinusoidal voltage for providing a base sweep for said beam moving means associated with each of said synchronous drive means.

8. A direction finder system for indicating the direction of transmitting stations within a given arc, comprising a plurality of directive antennas arranged about a given point each having its directive action outwardly from said point, control means for controlling the directive action of each of said antennas to sweep it through a given angle whereby said antennas cover a resultant given arc sweep about said point, synchronous drive means for driving said control means for each of said antennas, an indicating oscilloscope having an indicating beam, means for producing a time base trace for said beam corresponding to each of said given angles operatively associated with said drive means, a receiver circuit having its output circuit coupled to said indicator to produce deflections of said beam effective on said traces in response to received signals, a switching circuit for successively coupling said antennas to said receiver for a period susbtantially equal to the time the corresponding directive action is being swept through its given angle, and means for selecting the proper position for the beam line trace on the indicator corresponding to the given angle being swept by said directive action operatively controlled by said switching circuit.

9. A system according to claim 8, in which said given arc comprises 360°, said antennas comprise four in number arranged to sweep 90° each, and said time base means is arranged to produce four separate corresponding 90° traces.

10. A system according to claim 8, in which said time base producing means comprise a sine wave generator, one for each of said antennas driven by said drive means and a combination of full wave rectifiers for each of said generators having polarities significant in respect to the relation of each of the traces to the corresponding relative angular portion of said given angle swept by the corresponding antenna, whereby the position of a trace is made to relate to said given angle.

11. A direction finder system for indicating the direction of transmitting stations within a given arc, comprising four directive antennas arranged about a given point each having its directive action outwardly from said point, individual control means for controlling the directive action of each of said antennas to sweep it through an angle of 90° whereby said antennas cover a resultant 360° arc sweep about said point, a synchronous motor for driving said control means for each of said antennas, an indicating oscilloscope having an indicating beam, a sine wave generator for producing a quarter circle time base trace for said beam, one generator being associated with each of said motors, a receiver circuit having its output circuit coupled to said indicator to produce deflections of said beam effective on said traces in response to received signals, a switching circuit for successively coupling said antennas to said receiver for a period substantially equal to the time the corresponding directive action is being swept through the respective 90° angle, double full wave rectifier means for each generator having opposite polarities cyclically switched by said switching circuit to deflect said indicating beam into the quadrant corresponding to the respective directive action being swept, and means for selecting the proper position for the beam line trace corresponding to the given angle being swept by said directive action operatively controlled by said switching circuit.

LAURIN G. FISCHER.

REFERENCES CITED

The following references are of record in the file of this patent:

UNITED STATES PATENTS

| Number | Name | Date |
|---|---|---|
| 2,208,378 | Luck | July 16, 1940 |
| 2,406,853 | Richardson et al. | Sept. 3, 1946 |
| 2,407,659 | Fuchs | Sept. 17, 1946 |
| 2,408,039 | Busignies | Sept. 24, 1946 |
| 2,408,040 | Busignies | Sept. 24, 1946 |
| 2,412,702 | Wolff | Dec. 17, 1946 |
| 2,412,703 | Wolff | Dec. 17, 1946 |
| 2,419,567 | Labin | Apr. 29, 1947 |